United States Patent [19]
Bristow et al.

[11] Patent Number: 5,841,843
[45] Date of Patent: Nov. 24, 1998

[54] FACSIMILE FORWARDING METHOD AND SYSTEM USING A SIMULATED TELEPHONE LINE INTERFACE

[75] Inventors: Stephen D. Bristow, Los Altos; Christopher B. Wright, San Francisco, both of Calif.

[73] Assignee: Brother International Corporation, Somerset, N.J.

[21] Appl. No.: 582,178

[22] Filed: Jan. 2, 1996

[51] Int. Cl.⁶ .............................. H04M 11/00; H04N 1/32
[52] U.S. Cl. ...................................... 379/100.09; 358/442
[58] Field of Search ................................. 379/100, 102, 379/96–99, 100.01, 100.03–100.06, 100.08, 100.09, 100.14; 358/400–403, 407, 434, 436, 438–440, 442, 468

[56] References Cited

U.S. PATENT DOCUMENTS

| | | |
|---|---|---|
| 4,072,824 | 2/1978 | Phillips . |
| 4,642,697 | 2/1987 | Wada ....................................... 379/100 |
| 4,652,933 | 3/1987 | Koshiishi . |
| 4,754,473 | 6/1988 | Edwards . |
| 4,922,524 | 5/1990 | Baba et al. . |
| 4,964,154 | 10/1990 | Shimotono . |
| 4,991,200 | 2/1991 | Lin . |
| 5,090,049 | 2/1992 | Chen . |
| 5,099,507 | 3/1992 | Mukai et al. . |
| 5,127,047 | 6/1992 | Bell et al. . |
| 5,127,048 | 6/1992 | Press et al. .............................. 379/100 |
| 5,128,980 | 7/1992 | Choi . |
| 5,138,654 | 8/1992 | Yuki . |
| 5,146,489 | 9/1992 | Telibasa . |
| 5,148,473 | 9/1992 | Freeland et al. . |
| 5,224,156 | 6/1993 | Fuller et al. . |
| 5,245,649 | 9/1993 | Eaton et al. . |
| 5,267,302 | 11/1993 | Kotani et al. . |
| 5,291,302 | 3/1994 | Gordon et al. ........................... 379/100 |
| 5,291,546 | 3/1994 | Giler et al. .............................. 379/100 |
| 5,311,570 | 5/1994 | Grimes et al. . |
| 5,363,207 | 11/1994 | Yoshihara et al. ....................... 358/442 |
| 5,416,827 | 5/1995 | Gaskill . |
| 5,428,663 | 6/1995 | Grimes et al. . |
| 5,452,106 | 9/1995 | Perkins . |
| 5,452,356 | 9/1995 | Albert . |

FOREIGN PATENT DOCUMENTS

| | | | |
|---|---|---|---|
| 8943456 | 5/1990 | Australia ............................... 379/100 |
| WO9320647 | 10/1993 | WIPO ................................... 379/100 |

*Primary Examiner*—Wing F. Chan
*Attorney, Agent, or Firm*—Oliff & Berridge

[57] ABSTRACT

A facsimile forwarding phone system for receiving, storing and transmitting facsimile data includes a facsimile forwarding device that receives, stores and transmits facsimile data to a remote destination device. The facsimile forwarding device generates simulated public switched telephone network (PSTN) signals and outputs them over the telephone line to the destination device, so that it appears to the destination device that it is directly attached to the public switched telephone network. The facsimile forwarding device generates a ring signal and sends it over the phone line to the destination device. Thus, it appears to the destination device that it is directly connected to the public switched telephone network, rather that to the facsimile forwarding device. The destination device may include remote facsimile machines and remote computer systems. The stored facsimile data is transmitted upon the facsimile forwarding phone system receiving a forwarding request. The forwarding request can be input on an input panel of the facsimile forwarding device or remotely.

12 Claims, 6 Drawing Sheets

FACSIMILE FORWARDING METHOD AND SYSTEM USING A SIMULATED TELEPHONE LINE INTERFACE

BACKGROUND OF THE INVENTION

1. Field of the Invention

This invention relates to a facsimile forwarding phone system and method for using the facsimile forwarding phone system. Specifically, this invention relates to a facsimile system for receiving, storing and forwarding facsimile data upon request.

2. Description of Related Art

Facsimile systems are in wide-spread use. Businesses, in particular, extensively use facsimile systems. Facsimile systems allow instantaneous transfer of data over telephone lines through the public switched telephone network (PSTN) between facsimile machines or computer systems and other facsimile machines or computer systems.

For several reasons, the immediate reception or printing of incoming facsimile transmissions is not possible or desirable. For instance, for a computer system using a standard fax/modem receiver to receive incoming facsimile transmissions, the computer system must be on and ready to receive such transmissions. Also, a user may desire to delay printing sensitive facsimile data when the user does not have immediate access to the facsimile machine. In addition, a facsimile machine receiving incoming facsimile data must be working properly and have an adequate supply of paper to properly receive the incoming data transmission.

Various solutions have been offered to overcome these problems. Computer systems can be left on continuously to allow them to receive incoming facsimile transmissions. Facsimile machines have been redesigned to incorporate memory devices that store incoming data transmissions when the facsimile machine is not working properly or the user has requested that printing of the facsimile transmissions be delayed. Facsimile message recorder/relay systems can be used in conjunction with local facsimile machines and/or computer systems.

However, these solutions create additional problems. For instance, keeping computer systems on continuously causes excess wear on the systems and increases the cost associated with utilizing such systems. Incorporating memory devices within facsimile machines increases the cost of such machines and any facsimile machine which does not have a memory device cannot be used in such a manner or must be replaced. In addition, using a fax message recording/relay system requires special protocols and/or communication ports to be used between the final destination fax machine or computer system and the forwarding fax relay device to overcome compatibility problems.

SUMMARY OF THE INVENTION

This invention has been made in view of the above problems. In particular, this invention provides a facsimile forwarding phone system in which the cost is reduced and the installation/operation is simplified.

This invention additionally provides a new and improved facsimile forwarding phone system and method for using the facsimile forwarding phone system.

This invention also provides a facsimile forwarding device that receives incoming facsimile data, stores the incoming facsimile data and forwards the incoming facsimile data or command to a final destination device.

This invention further provides a facsimile forwarding device that receives incoming facsimile data, stores the incoming facsimile data and forwards the incoming facsimile data over a simulated telephone line to a final destination device.

This invention still further provides a facsimile forwarding device that receives incoming facsimile data, stores the incoming facsimile data and forwards the incoming facsimile data over a simulated telephone line using a generated ring signal to a final destination device.

This invention additionally provides a facsimile forwarding device that allows stored facsimile data to be forwarded to a final destination device that has been designated locally or by remote request.

In a first preferred embodiment of this invention, the facsimile forwarding phone system comprises a facsimile forwarding device for receiving, storing and transmitting facsimile data, where the facsimile forwarding device has a first connector connecting the facsimile forwarding device to an external telephone line to receive facsimile data and a second connector connecting the facsimile forwarding device to a destination device. The facsimile forwarding phone system also includes circuitry to simulate a public switched telephone network (PSTN) line between the facsimile forwarding device and the destination device and a ring generator for generating a ring signal over the simulated line.

The destination device comprises a remotely located facsimile machine or computer system. The facsimile forwarding device can also include a printing device for locally printing the stored facsimile data. The facsimile forwarding phone system can also include a requesting device for receiving a facsimile forwarding request. The requesting device can include a local input panel for locally inputting the facsimile forwarding request.

In a second preferred embodiment, a facsimile forwarding apparatus for receiving, storing and transmitting facsimile data includes a facsimile forwarding device that receives, stores and transmits facsimile data. The facsimile forwarding apparatus also includes a first connector connecting the facsimile forwarding device with an external telephone line and a second connector connecting the facsimile forwarding device with a destination device. The facsimile forwarding apparatus further includes a telephone line, where a first end of the telephone line is connected to the second connector and the second end of the telephone line is connected to the destination device. A signal generator that generates simulated public switched telephone network signals, such as a ring signal, is connected to the second connector.

This invention also includes a method for operating facsimile forwarding phone which includes connecting a facsimile forwarding device to an external telephone line, receiving an incoming facsimile transmission, connecting the facsimile forwarding device to a destination device over a simulated PSTN telephone line, generating and transmitting a ring signal over the simulated PSTN telephone line to the destination device, and transmitting the stored facsimile transmission over the simulated PSTN telephone line to the destination device.

The facsimile forwarding method further includes printing the stored facsimile transmission using the facsimile forwarding device. The facsimile forwarding method also includes requesting forwarding of the stored facsimile transmission.

These and other features and advantages of the invention are described in or apparent from the following detailed description of the preferred embodiments.

BRIEF DESCRIPTION OF THE DRAWINGS

The above and other features of this invention will be more readily understood when the following detailed description is considered in conjunction with the accompanying drawings wherein like characters represent like parts throughout the several figures and in which.

DETAILED DESCRIPTION OF PREFERRED EMBODIMENTS

Figure 1:
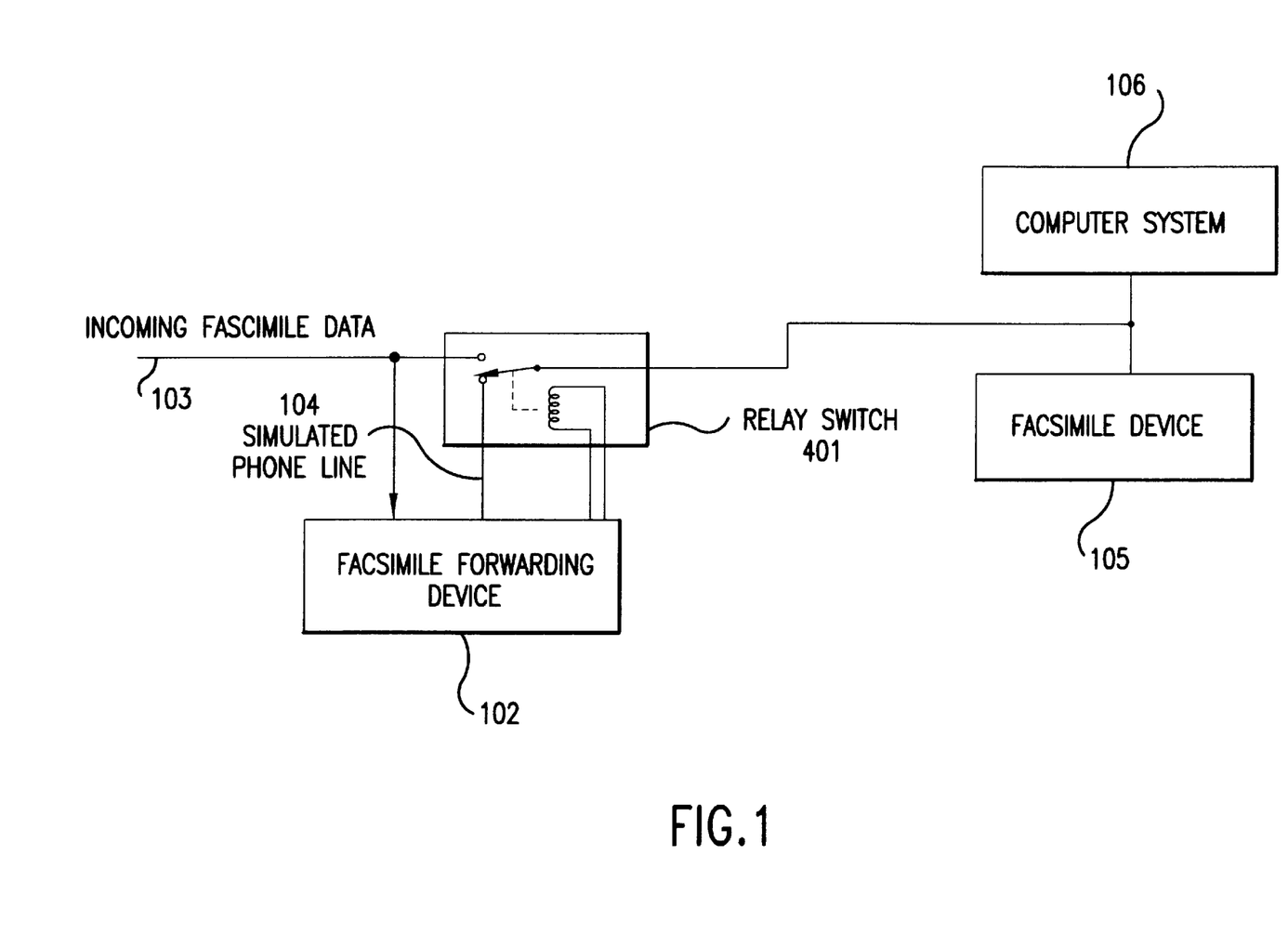
FIG. 1 is a simplified block diagram of one preferred embodiment of the facsimile forwarding phone system of this invention.

FIG. 1 is a simplified block diagram of one preferred embodiment of a facsimile forwarding phone system 100 of this invention. As shown in FIG. 1, the facsimile forwarding device 102 is connected to an external telephone line 103. The facsimile forwarding device 102 receives incoming facsimile transmissions of facsimile data over a public switch telephone network (PSTN) connected to the telephone line 103. The facsimile data of the incoming facsimile transmissions are received and stored by the facsimile forwarding device 102. Upon receiving a request for transmission of the stored facsimile data, the facsimile forwarding device 102 transmits the stored facsimile data over a simulated telephone line 104 to a destination device. The destination device can be a remotely located facsimile device 105 and/or a remotely located computer system 106. A remotely located device can be any device that is physically distant from the facsimile forwarding device 102. Also shown is a relay switch 401. The relay switch 401 either connects the remote device to the simulated phone line 104, or bypasses the facsimile forwarding device 102 by connecting the remote device directly to the telephone line 103.

Figure 3:
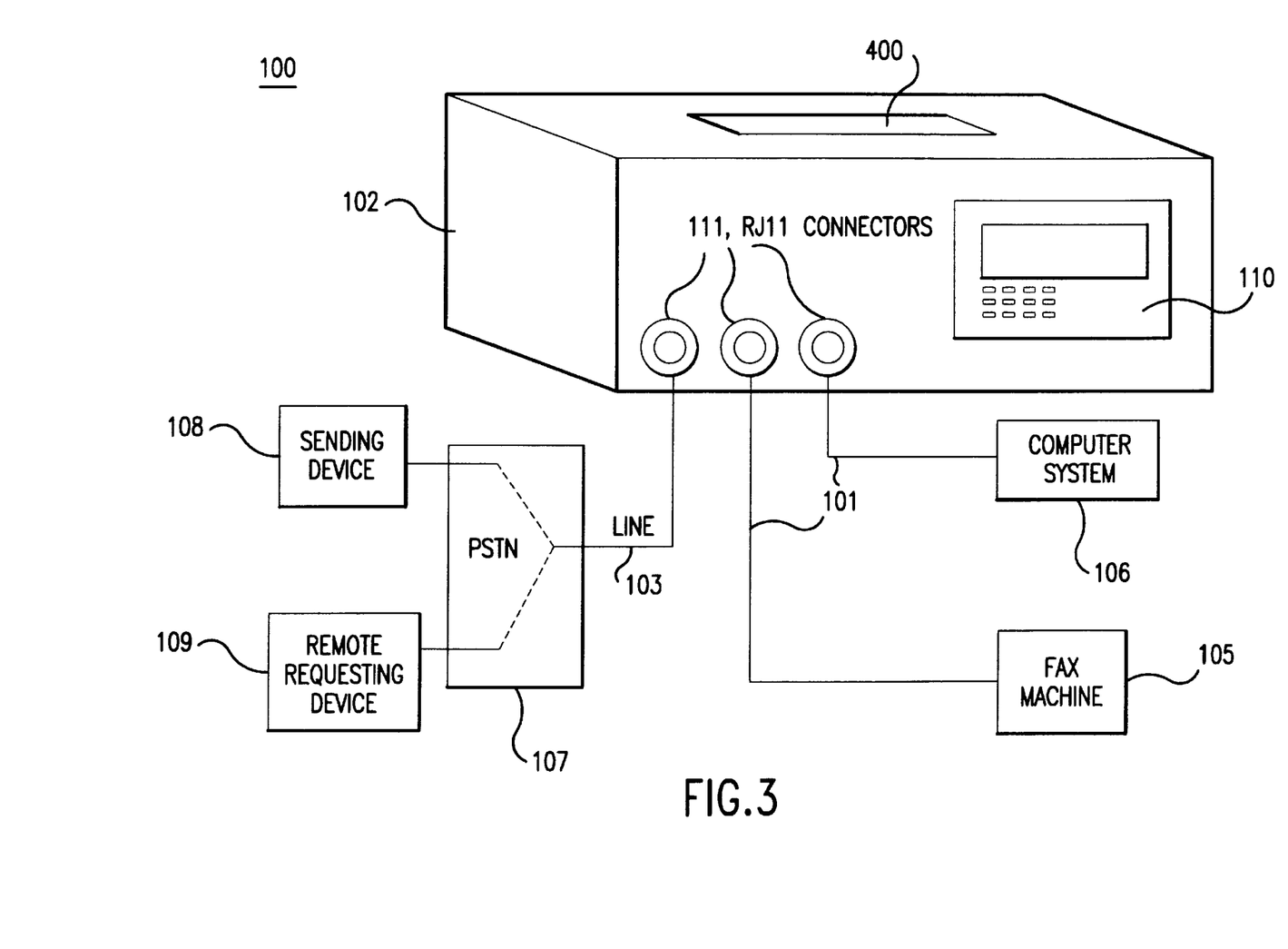
FIG. 3 is another simplified block diagram of the facsimile forwarding phone system of this invention.

The request for forwarding of the stored facsimile data can be generated at a display panel 110 of the facsimile forwarding device 102, as shown in FIG. 3. Alternatively, it can be generated remotely and transmitted to the facsimile forwarding device 102 over the PSTN and the telephone line 103. One novel aspect of this device is the bypass operation. The true phone line 15 passes through normally by relay. After a preset number of rings is detected, the relay switches and the facsimile forwarding device 102 goes off hook. This allows the external destination devices 105 and 106 to seize the line and receive a facsimile independently, if the user desires.

Figure 2:
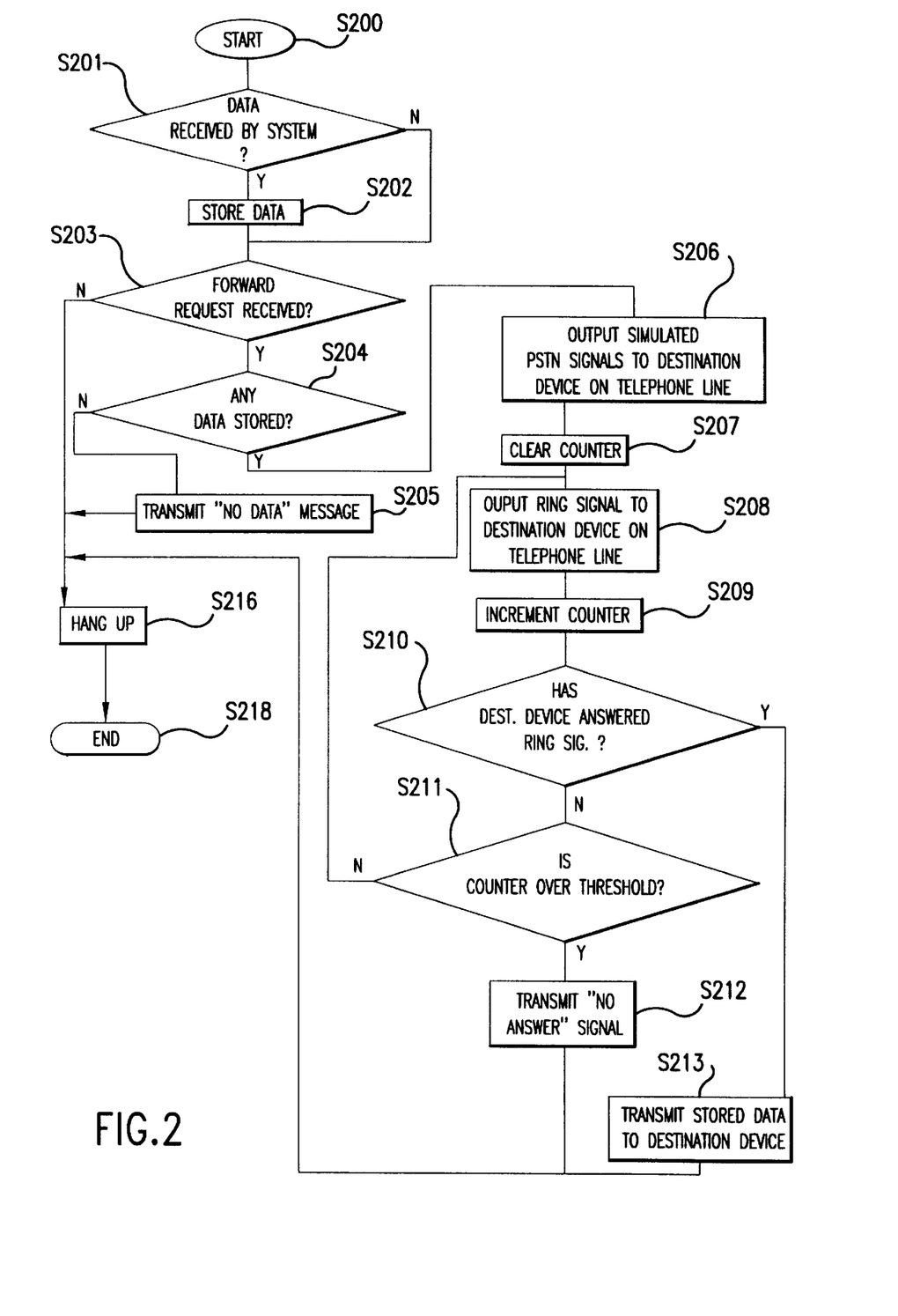
FIG. 2 is a simplified flowchart of the operation of the facsimile forwarding phone system of this invention.

FIG. 2 shows one preferred embodiment of a method for operating the facsimile forwarding of this invention. After waiting a selectable number of rings sufficient to insure that the user desires the facsimile forwarding device 102 to seize the line, the facsimile forwarding device 102 disconnects the external destination devices 105 and/or 106 and then begins operating according to step S200. In step S201, the facsimile forwarding device 102 continuously monitors for incoming facsimile data. If, in step S201, incoming facsimile data is detected, control continues to step S202. Otherwise, control jumps to step S203. In step S202, the facsimile forwarding device 102 stores the facsimile data. After storing the incoming data in step S202, control continues to step S203. In step S203, the facsimile forwarding device 102 monitors for a request for the stored data to be forwarded. If, in step S203, a request has not been received, control jumps to step S216 where the facsimile forwarding device 102 hangs up the external phone line 103, and the control sequence ends. If, in step S203, a request for the data to be forwarded has been received, control continues to step S204. In step S204, the facsimile forwarding device 102 checks to see if any facsimile data has been stored.

If, in step S204, the facsimile forwarding device 102 determines that no data has been stored, control continues to step S205. In step S205, the facsimile forwarding device 102 transmits a "No Data" message to the requesting device or to the input panel 110. Control then jumps to step S216, where the facsimile forwarding device 102 hangs up the external phone line 103, and the sequence is complete. If however, in step S204, the facsimile forwarding device 102 determines that facsimile data has been stored, control jumps to step S206. In step S206, the facsimile forwarding device 102 establishes a simulated PSTN telephone line to the destination device 105 or 106.

Next, in step S207, a ring counter is cleared. In step S208, the facsimile forwarding device 102 generates a ring signal and transmits a simulated PSTN ring signal over the simulated line 104. Then, in step S209, the ring counter is incremented. In step S210, the facsimile forwarding device 102 determines whether the destination device 105 or 106 has answered the simulated PSTN ring signal transmitted over the simulated phone line 104. If, in step S210, the destination device 105 or 106 has not answered the simulated PSTN ring signal, control continues to step S211.

In step S211, the facsimile forwarding device determines if the value of the ring counter is over a threshold. If the ring counter is not over the threshold, control jumps back to step S210. However, if the ring counter is over the threshold, control continues to step S212. In step S212, the facsimile forwarding device outputs a "No Answer" message, and hangs up the simulated PSTN phone line by terminating the PSTN signals being generated and transmitted over the phone line 104 to the destination device 105 or 106. Control then jumps to step S216, where the facsimile forwarding device hangs up the external phone line 103, and the sequence is complete.

If, in step S210, the destination device has answered the ring signal and acknowledged the facsimile forwarding device, control jumps to step S213. In step S213, the facsimile forwarding device transmits the stored facsimile data over the phone line 104 using simulated PSTN signals to the destination device 105 or 106. Control then proceeds to step S216, where the facsimile forwarding device 102 hangs up the external phone line 103, and the sequence is complete. Note that the caller calling in on the external phone line 103 with data to forward can hang up any time beginning with step S206, without harming transmission of the data from the facsimile forwarding device 102 to the destination device 105 and/or 106 at the other end of the simulated phone line 104. Additional steps can easily be inserted into the sequence shown in FIG. 2. For example, after the stored data has been transmitted to the destination device 105 and/or 106 in step S213, the stored data can be deleted from memory of the facsimile forwarding device 102.

The above-outlined flowchart is preferably implemented on a programmed microprocessor or microcontroller and peripheral integrated circuit elements. However, the above-outlined flowchart can also be implemented on a general or special purpose computer, an ASIC or other integrated circuit, a hardwired electronic or logic circuit such as a discrete element circuit, a programmable logic device such as a PLD, PLA or PAL, or the like. In general, any device on which a finite state machine capable of implementing the flowchart shown in FIG. 2 can be used to implement the controller control system 200 and/or the controller 113.

FIG. 3 shows another illustration of the facsimile forwarding phone system. As shown in FIG. 3, the facsimile forwarding device 102 includes a local display panel 110. Local requests for forwarding the stored data can be input through the local display panel 110. The facsimile forwarding device 102 also includes a plurality of standard RJ11 standard telephone jacks 111 for connecting the facsimile forwarding device 102 to a sending device 108 over an external telephone line 103 connected to the PSTN 107 and to remotely located destination devices 105 and 106 over simulated PSTN telephone lines 104.

The use of simulated PSTN telephone lines and standard RJ11 telephone jacks allows the destination device to be connected to the facsimile forwarding device 102 without using a serial cable and a serial port of the destination device. Therefore, computer systems and facsimile machines do not have to tie up one of their limited number of serial ports. Since the facsimile forwards phone system 102 simulates PSTN signals over the simulated PSTN telephone lines 104, the destination device does not need special software or hardware. The destination device acts as if it were connected directly to the PSTN telephone line 107 and thus can utilize standard software and equipment.

As shown in FIG. 3, a remotely located requesting device 109 can also connect to the facsimile forwarding phone system 102 over the PSTN telephone line 107 through one of the standard RJ11 telephone jack 111. This enables a user to call from a remote location and request forwarding of stored facsimile data using the PSTN 107. Alternately, a user can request forwarding by inputting the request through the facsimile forwarding device display panel 110. This panel 110 can be as simple as a button and an LED or as complex as a full keyboard and LCD display (as shown). The facsimile forwarding device 102 can also include a printing device 400 for locally printing facsimile data stored in the facsimile forwarding device 102.

Figure 4:
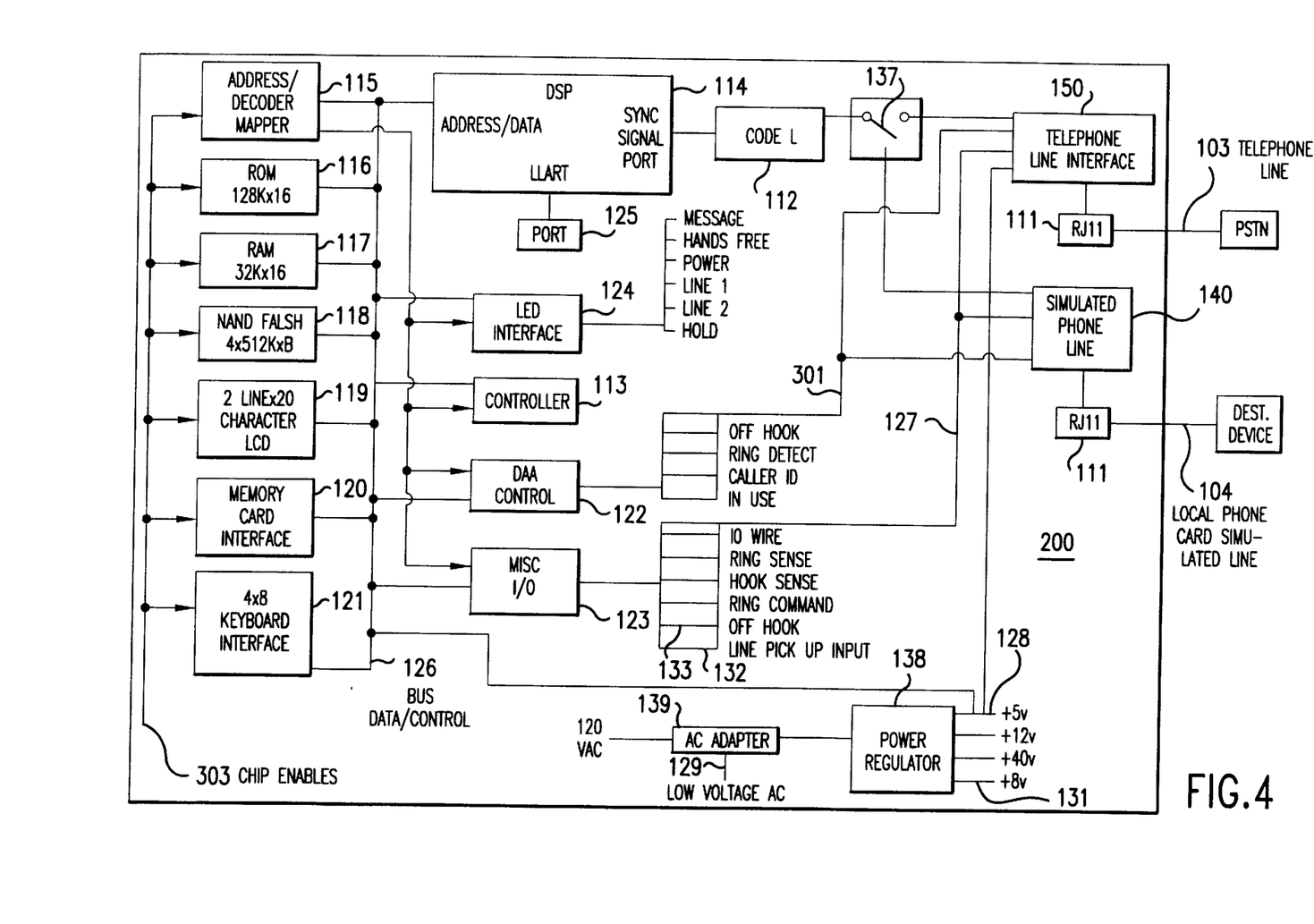
FIG. 4 is a simplified block diagram of one preferred embodiment of the control system of the facsimile forwarding device.

FIG. 4 shows one preferred embodiment of the control system 200 for the facsimile forwarding device 102. As shown in FIG. 4, the telephone line interface 150 is connected through a RJ11 jack 111 and the telephone line 103 to the PSTN 107. Data coming in over the PSTN 107 or data to go out over the PSTN 107 passes through the telephone line interface 150. When sending or receiving data from a remotely located destination device over the simulated telephone line, incoming and outgoing data passes through the simulated telephone line interface 140. For incoming facsimile data, the data is input through the telephone line interface 150 via a switch 137 to the CODEC 112. The CODEC 112 sends the incoming data to the digital signal processor (DSP) 114 for processing.

The address decoder mapper 115 is a common address decoding mapping circuit that, upon receipt of a particular address or range of addresses, creates a chip enable or other signal to cause a peripheral chip, device, or system to operate, accept data, or write data onto the bus.

The ROM 116 is a common read only memory. The RAM 117 is a common scratch pad memory. The NAND flash 118 is a common flash memory used to store fax images, voice mail, and non-volatile data. This memory can be any type of flash memory. Alternatively, static RAM or dynamic RAM memory could be used. Flash memory is preferred, but the other types will work if battery back up circuits are provided or if the loss of data on power failure is acceptable.

The 2 line×20 character LCD 119 is a commercially available graphic LCD display panel. While the LCD 119 is preferred, it is not strictly required.

The memory card interface 120 is used to allow the user to input and store autodial phone numbers on a removable medium. While it is preferred, it is not strictly required.

The 4×8 keyboard interface 121 is used for control and for inputting commands into the system.

The DSP 114 is a commonly known, commercially available digital signal processor, such as the Texas Instruments TMS320c209.

The RS232 port 125 is a TTL-to-RS232 level converter chip such as those produced by Maxim Corporation of Milpitas, Calif., together with a DB9 or DB25 RS232 connector. The voltage levels and signals are well known in the art and are standardized by the Electronics Industries Association (EIA) which publishes the standard.

The LED interface 124 is a set of drivers that allow the DSP 114 or the controller 113 to turn LEDs ON or OFF.

The controller 113 is an optional microcontroller that may handle some of the processing chores that the DSP 114 would otherwise have to do. In a minimal cost product employing the invention, the microcontroller will not be present. Instead, the DSP 114 will perform all processing within the facsimile forwarding device 102.

The data access arrangement (DAA) control 122 is an interface circuit that allows the DSP 114 or the microcontroller 113 to control the telephone line interface 150. It also allows signals from the telephone line interface 150 to be read by the DSP 114 or the microcontroller 113. In this way, the DAA control 122 enables the DSP 114 or the microcontroller 113 to read signals indicative of caller ID data.

The CODEC 112 is a coder/decoder that converts the signals from the DSP 114 to analog levels for use in a phone network. The CODEC 112 also converts analog signals from the phone network into digital data that the DSP 114 can read.

The MISC. I/O 123 is an interface circuit that allows the DSP 114 or the microcontroller 113 to sense various status signals and to issue controls to the physical hardware of the facsimile forwarding device 102. This includes outputting signals that cause a ring signal to be made audible at the phone, to cause the telephone line interface to go off hook, etc. This also includes the ability to sense the status of the local hook switch and the status of the ring detector in the telephone line interface 150.

The analog switches 137, such as the Harris 4050, allow analog voice and data signals to be switched by means of electronic control. They are equivalent to relays. Accordingly, relays could replace the analog switches in other implementations of the invention.

The telephone line interface 150 is a circuit that is designed to meet FCC part 68 rules and other standards. The telephone line interface 150 couples signals from the facsimile forwarding device 102 to the phone line 103. Its operation is well understood within the industry, and complete modules can be purchased from companies such as Cermetek of Sunnyvale, Calif. The telephone line interface 150 includes the ability to sense the status of a phone line, to detect rings, and to seize the line.

The connector 111 is an RJ11 standard plug.

The simulated phone line 180 is a circuit that provides all the functions of a telephone communication company central office, such as battery feed and ring generation.

The simulated line 104 is a local phone cord that connects the facsimile forwarding device 102 to the destination devices 105 and/or 106. The line 104 is used to simulate a phone line to the destination devices, and is typically a phone cord with an RJ11 modular plug at each end.

The AC adapter 139 and the power regulator 138 together comprise the local power supply. The AC adapter 139 is coupled to a wall outlet and produces low voltage AC. The power regulator 138 is a power supply and regulator that produces the required regulated and unregulated DC power levels needed for use in the rest of the circuits in the facsimile forwarding device 102.

The switch 137 also connects the CODEC 112 to the simulated telephone line interface 140. The output of the simulated telephone line interface 140 is connected through the standard RJ11 telephone jack to a telephone line 104. The other end of the telephone line 104 is connected to a destination device 105 or 106.

From the DSP 114, the data is sent over the data/control/power bus 126 to the necessary system components based on control signals output by the controller 113 or the DSP 114. For example, the address/decoder mapper 115 expands the I/O space of the DSP 114 by decoding selected addresses into chip and device enable signals in the conventional manner. The ROM 116 contains one or more stored programs used by the controller 113 and/or the DSP 114 to operate the facsimile forwarding phone system 107. The RAM 117 is a scratchpad memory. The flash memory 118, which may be of the NAND type, is non-volatile storage location for information to be retained should power be disconnected from the facsimile forwarding phone system 102. The LCD 119 displays system information on the local input panel 110. The keyboard interface 121 allows data to be input from the input panel 110 into the facsimile forwarding device 102 and processed.

The data access arrangement (DAA) 122 decodes control signals to control the telephone line and interfaces the telephone line interface 150 so that its control signals can be read. The Miscellaneous Input/Output (MISC I/O) 123 processes command signals output by the controller 113 and/or the DSP 114 and outputs signals to the corresponding activation circuits as well as interfacing the status signals of hook sense and ring sense to the controller 113 and the DSP 114. The LED interface 124 controls the on/off state of the LEDs of the device 102. These LEDs indicate the status of the facsimile forwarding device 102, such as message waiting, hands free, power on, Line 1 busy, Line 2 busy, hold and the like. The RS232 Port 125 allows for direct communication between the facsimile forwarding device 102 and a computer. The AC adapter 139 converts the 120V AC power supply to a low voltage (45V or less) AC power signal 129. The power regulator 138 converts the low voltage AC power signal from the AC adapter 139 to 5V, 12V, 40V and 8V power signals.

Figure 5:
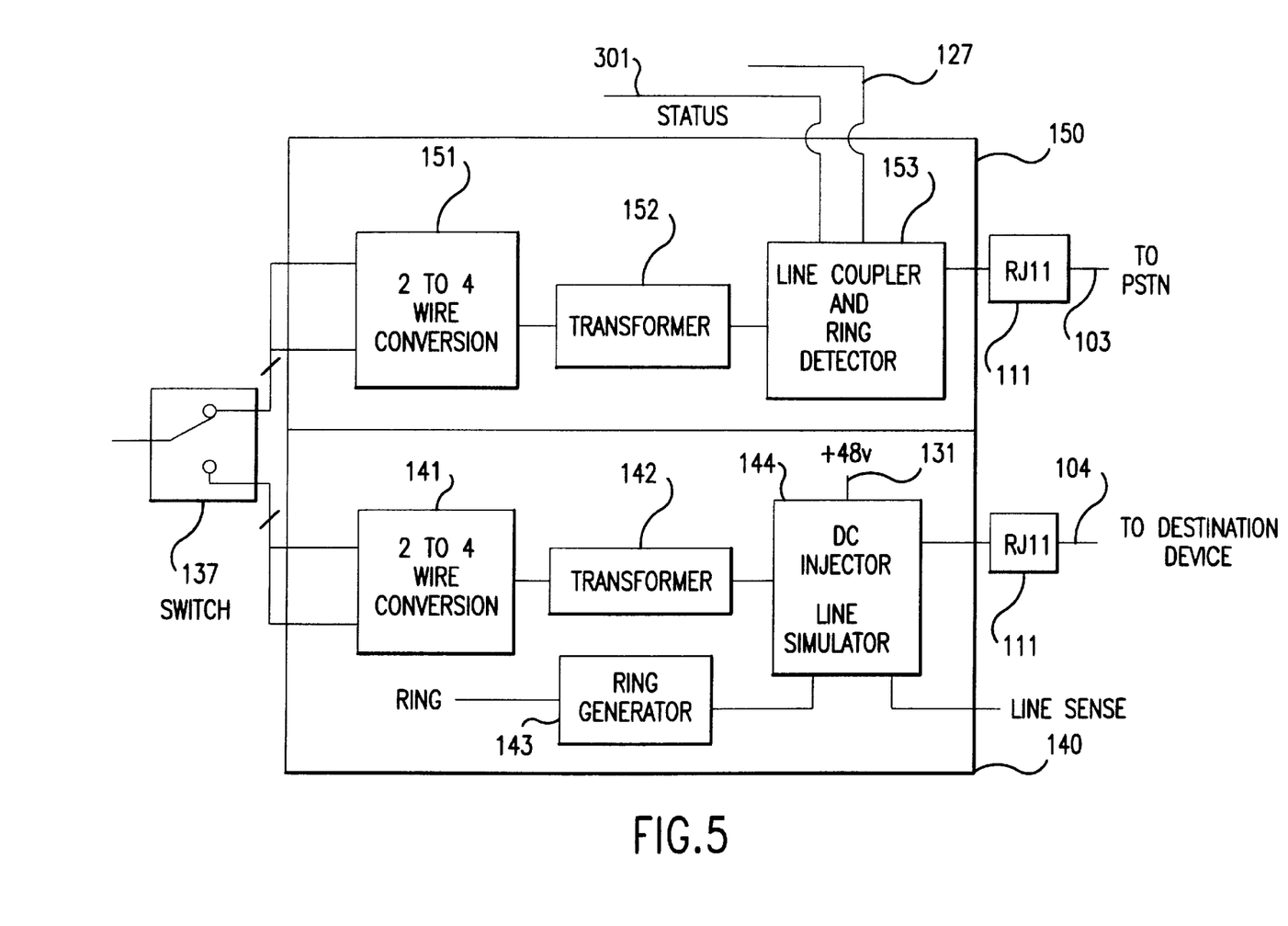
FIG. 5 is a simplified block diagram of one preferred embodiment of the telephone line interface and the simulated telephone line interface of the facsimile forwarding device of FIG. 4.

FIG. 5 shows a simplified block diagram of the simulated telephone line interface 140 and the telephone line interface 150. The output of the telephone line interface 150 is connected to a standard RJ11 telephone jack 111. The standard RJ11 telephone jack is connectable to an RJ11 plug, which is connected to an external telephone line 103. The external telephone line 103 can be connected to the PSTN 107.

The analog switch 137 is described above with respect to FIG. 4. The function of the 2-to-4 wire conversion units 141 and 151 is well understood and commonly used in the art of telecommunications. Within the phone instrument there are usually separate transmit and separate receive signals. Each of these signals traditionally requires a pair of wires. The phone line, which has two wires, carries both the transmitted and received audio signals at the same time. The 2-to-4 conversion units 141 and 151 convert the two-wire telephone company line into separate received data from the phone line and couples the transmitted data onto the phone line. Even though a circuit may not use a pair of wires for the transmit or the receive, because they share a common ground and only require three wires between them, the circuit is still referred to as a 2 to 4 wire conversion circuit within the art and field of telecommunications. The actual details of this circuit can be implemented in a number of ways using combinations of passive and active circuitry. One transformer-based circuit is disclosed on page 56/3 of the 5th edition of the ELECTRONICS ENGINEER'S REFERENCE BOOK, by F. Mazda, published by Butterworths in 1985.

The transformers 152 and 142 are used to match the impedance from the instrument to the telephone company phone line and to provide DC isolation between the phone line and the rest of the facsimile forwarding device 102.

The line coupler and ring detector 153 typically includes passive components to provide power surge protection and filtering between the phone line and the transformer, ring detection circuits, and relays that provide a switchable circuit to connect audio paths to the phone line and to switch a DC current load onto the phone line. The DC current load is needed to cause the phone company to recognize that the instrument has gone off hook. The ring detector is needed to detect the ring voltage provided on the line by the telephone company, and signal this detection to the DSP 114 and/or the microcontroller 113.

The ring generator 143 provides a nominal 45–110 volt, 20–60 Hz AC ring signal that can be coupled to the destination device. This voltage is equivalent to the ring voltage that the telephone company provides to a customer's phone instrument when it wants to ring the customer. This signal is used to alert the destination device so that it will answer the call. After the phone line has been answered, the ring generator is turned off.

The +48V voltage line 131 provides the nominal battery feed voltage that is coupled to the destination device to provide what is commonly called loop current. The loop current powers the phone line circuit in some destination devices and is analogous to the battery feed voltage that the telephone company commonly provides to a customer after they have gone off hook.

The line simulator 144 couples the DC battery feed, ring, and data signals onto the simulated phone line, and is described in greater detail below.

The incoming data passes through the standard RJ11 telephone jack 111 to the line coupler and ring detector 153. The line coupler and ring detector 153 detects an incoming signal and sends an off-hook, ring detect, and in-use signals to the microcontroller 113 and/or the DSP 114 via lines 301 and 127 and sends audio band data, including the caller ID information, to the CODEC 112 through a transformer 152 and a 2-to-4 wire conversion unit 157 via the switch 137.

The simulated telephone line interface 140 is connected to a standard RJ11 telephone jack. When the system sends information to the destination device 105 or 106, the switch 137 is connected to interface 140. Accordingly, data is transferred from the CODEC 112 to the wire conversion circuit 141. From the 2-to-4 wire conversion unit, the data is passed through a transformer 142. The transformer 142 is used to match the impedance of the simulated telephone line interface to the impedance of the destination device 105 or 106. The line simulator 144 places a DC voltage on the telephone line 104 to simulate the central office battery to enable the data to be transmitted to the destination device 105 or 106. The ring signal from the ring generator 143 is used to alert the destination device 105 or 106 and cause it to go off hook.

Figure 6:
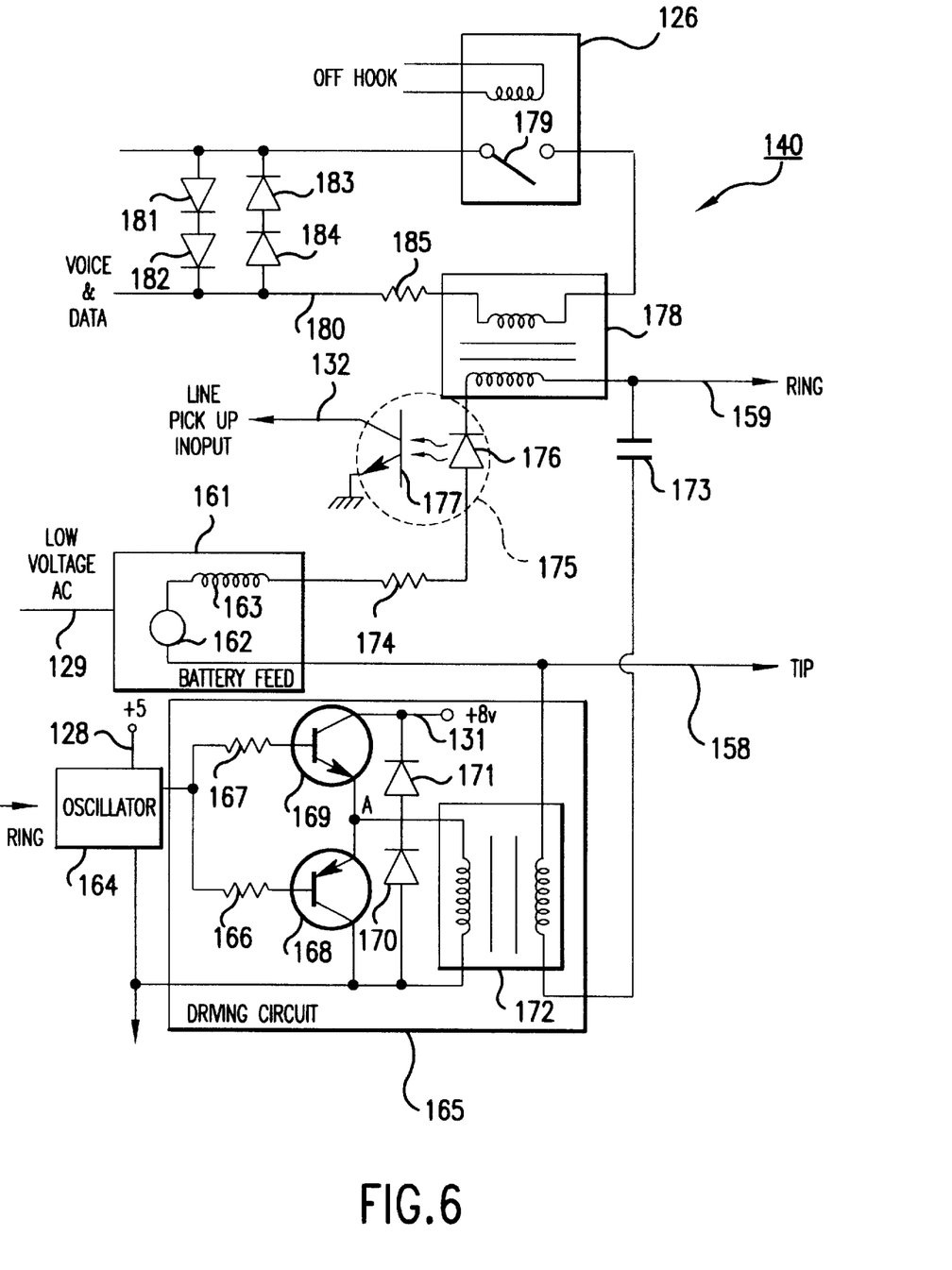
FIG. 6 is a detailed circuit diagram of the simulated telephone line interface.

FIG. 6 shows the simulated telephone line interface 140 in even greater detail. As shown in FIG. 6, the battery feed 161 is connected to the low voltage output 129 of the AC adaptor 139. The battery feed 161 includes an AC to DC power supply 162 that generates approximately 45VDC and an inductor 163. The inductance of the inductor 163 is preferably 10 H. The inductor 163 can be deleted to reduce cost. The battery feed 161 supplies the current for transmitting data over the simulated telephone line 104 to the destination device 105 or 106.

When forwarding stored facsimile data, the facsimile forwarding device 102 generates and outputs a ring signal and other PSTN signals to the destination device 105 or 106. Thus, the destination device 105 or 106 is unable to distinguish between an original or forwarded transmission.

To simulate a ring signal, a ring command signal output from the controller 113 through the MISC I/O 123 is input by the control terminal of the controllable 20 Hz oscillator 164. The oscillator 164 is connected between the +5V output 128 of the power regulator 138 and ground. The output of the 20 Hz oscillator 164 is connected to a first resistor 166 and a second resistor 167 of a driving circuit 165. The first resistor 166 is connected to the base of a first transistor 168. The second resistor 167 is connected to the base of a second transistor 169. The collector of the first transistor 168 is connected to ground, while the collector of the second transistor 169 is connected to the +8V unregulated output 131 of the power regulator 138. The emitters of the first and second transistors 168 and 169 are connected at node A.

In parallel to the first and second transistors, a first diode 170 and a second diode 171 are connected in series between ground and the +8V unregulated output 131 of the power regulator 138. The anode of the first diode 170 is connected to ground, while the cathode of the first diode 170 is connected to the anode of the second diode 171, which are both connected to node A. The cathode of the second diode is connected to the +8V unregulated output 131.

A first transformer 172 has a primary coil and secondary coil. The primary coil of the first transformer 172 is connected between node A and ground. The secondary coil of the first transformer is connected between a first output of the battery feed 161 and a capacitor 173. The first output of the battery feed 161 is also connected to the TIP line 158. The 65V ring signal is transmitted over the simulated telephone line 104 to the destination device through the RING line 159 and the TIP line 158, which are the twisted pair wires of the telephone line 104.

When the destination device answers the ring signal, the resulting DC current flow is detected by an opto-coupler 175. The second output of the battery feed 161 is connected to the anode of a photo-emitting diode 176 of the opto-coupler. A photo-detector 177 of the opto-coupler 175 is connected between ground and the line pickup input 132 of the MISC I/O 123. The cathode of the photo-emitting diode 176 is connected to the primary coil of a second transformer 178. The other end of the primary coil is also connected to the ring line 159, as is the other end of the capacitor 173. A line-pick-up signal is output to the MISC I/O 123 over the line-pick-up line 132.

The MISC I/O 123 outputs an off-hook signal to the hook relay 126 over the off-hook line 133. When the switch contact 179 of the relay is closed, the output of the second, or coupling, transformer 178 is connected to the audio and data circuits. That is, the one end of the secondary coil of the second transformer is connected to the switch 179. The second end of the secondary coil is connected to the audio and data input line 180 through a fourth resistor 185. Four diodes 181–184 in the output of the secondary of the coupling transformer 131 to limit the peak to peak voltage to 1.5 on the audio and data line 180 to protect the electronics of the facsimile forwarding device 102. The third and fourth resistors 174 and 185 limit the current and match the impedance of the TIP and RING lines 158 and 159 to the impedance of the destination device, which has a nominal impedance of 600Ω.

This invention has been described with reference to preferred embodiments outlined above, which are intended to be illustrative, not limiting. Various modifications will be apparent to those of ordinary skill in the art and are intended to be encompassed within the spirit and scope of the invention, as set forth in the appended claims.

What is claimed is:

1. A facsimile forwarding phone system comprising:
    a facsimile forwarding device capable of receiving facsimile data, storing the facsimile data and transmitting the stored facsimile data;
    a first connector for connecting the facsimile forwarding device to a public switched telephone network, the fax forwarding device receiving the facsimile data from the public switched telephone network; and
    a second connector for connecting the facsimile forwarding device to a destination device capable of receiving facsimile data, the fax forwarding device transmitting the received and stored fax data to the destination device;
    wherein the facsimile forwarding device comprises:
        an input circuit for inputting facsimile data from the first connector;
        a storage circuit for storing the received facsimile data; and
        a simulated telephone line interface for generating and outputting public switched telephone signals to the second connector and for outputting the received and stored facsimile data to the second connector in response to a received forwarding request.

2. The facsimile forwarding phone system according to claimed 1, wherein the destination device comprises a facsimile machine.

3. The facsimile forwarding phone system according to claim 1, wherein the destination device comprises a computer system.

4. The facsimile forwarding phone system according to claim 1, wherein the facsimile forwarding device comprises a printing device for locally printing stored facsimile data.

5. The facsimile forwarding phone system according to claim 1, further comprising an input panel.

6. A method for receiving, storing and transmitting facsimile data, comprising the steps of:

connecting a facsimile forwarding device to an external telephone line;

receiving an incoming transmission of facsimile data from the external telephone line and storing the received facsimile data;

receiving a forwarding request;

connecting a signal transmission cable directly between the facsimile forwarding device and a destination device;

simulating public switched telephone network signals, including a ring signal, on the signal transmission cable;

detecting when the destination device answers the ring signal; and transmitting the received and stored facsimile data over the signal transmission cable to the destination device using the public switched telephone network signals in response to the received forwarding request.

7. The method according to claim 6, further comprising the step of printing the received and stored facsimile data using the facsimile forwarding device.

8. A facsimile forwarding phone system for receiving facsimile data, storing the facsimile data and transmitting the received and stored facsimile data, comprising:

facsimile forwarding means for receiving the facsimile data, storing the facsimile data and transmitting the facsimile data;

first connecting means for connecting the facsimile forwarding means to an external telephone line;

second connecting means for connecting the facsimile forwarding means to a destination device; and simulated telephone line means for simulating a public switched telephone network telephone line between the facsimile forwarding means and the destination device;

wherein the facsimile forwarding means transmits the received and stored facsimile data to the destination device via the simulated telephone line means and the second connection means in response to a received forwarding request.

9. The facsimile forwarding phone system according to claim 8, further comprising a local input panel.

10. The facsimile forwarding phone system according to claim 8, wherein the destination device comprises a facsimile machine.

11. The facsimile forwarding phone system according to claim 8, wherein the destination device comprises a computer system.

12. The facsimile system according to claim 8, wherein the facsimile forwarding means comprises printing means for locally printing the stored facsimile data.

* * * * *